No. 878,116.  
J. P. BURGESS.  
PATENTED FEB. 4, 1908.  
METHOD OF SEPARATING BUCKHORN AND PLANTAIN SEEDS FROM CLOVER SEEDS.  
APPLICATION FILED OCT. 25, 1906.

WITNESSES:

Joseph P. Burgess INVENTOR

By C. A. Snow & Co.

ATTORNEYS

THE NORRIS PETERS CO., WASHINGTON, D. C.

UNITED STATES PATENT OFFICE.

JOSEPH P. BURGESS, OF DEPAUW, INDIANA.

METHOD OF SEPARATING BUCKHORN AND PLANTAIN SEEDS FROM CLOVER-SEEDS.

No. 878,116.  Specification of Letters Patent.  Patented Feb. 4, 1908.

Application filed October 25, 1906. Serial No. 340,566.

*To all whom it may concern:*

Be it known that I, JOSEPH P. BURGESS, a citizen of the United States, residing at Depauw, in the county of Harrison and State of Indiana, have invented a new and useful Method of Separating Buckhorn and Plantain Seeds from Clover-Seeds, of which the following is a specification.

This invention relates to a method of separating buck horn and plantain seeds from clover seed.

The object of the invention is to enable the clover seed to be thoroughly separated from the undesirable seeds above mentioned without the necessity of employing any expensive or complicated apparatus.

Heretofore the separation herein mentioned has been carried out with best results in two ways. The first method has been to soak all of the seeds until the plantain and buck horn seeds swell, after which the seeds are drained and screened and then spread out in thin layers to dry; the seeds are then placed upon a screen which will permit the passage of only the clover seed. This process has been found objectionable in that it necessitates the use of canvas or other material on which the seeds must be spread to be dried. Moreover, the seeds become discolored as a result of this process, and considerable time is wasted in carrying the process into effect. Another method which has been used consists of mixing the seeds with dampened sawdust, after which the mixture is spread on a canvas or other smooth surface to partially dry and then is screened to remove some of the objectionable seeds, after which the screened seeds are spread out to dry and again screened through a fanning mill. This process is objectionable for the reasons above mentioned and also because the use of dampened sawdust softens the seed.

The process embodied in the present invention obviates all of the disadvantages which have been experienced heretofore, and said process consists of certain steps which will be hereinafter more fully described and pointed out in the claims.

In the accompanying drawings is shown one form of the apparatus which may be used in carrying out the process.

Figure 1:
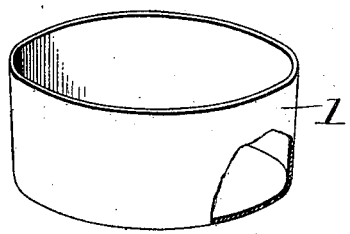
Figure 2:
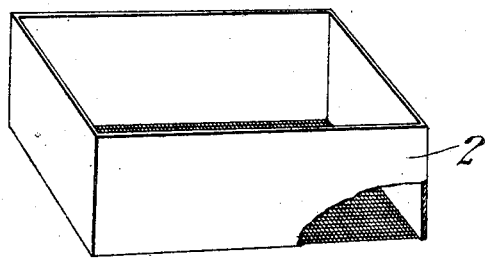
Figure 3:
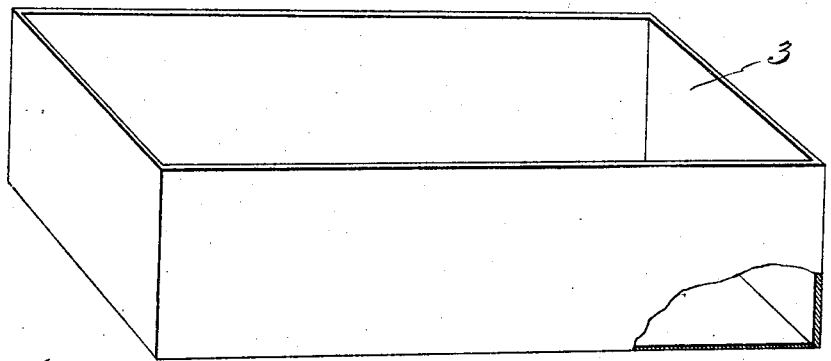
Figure 4:
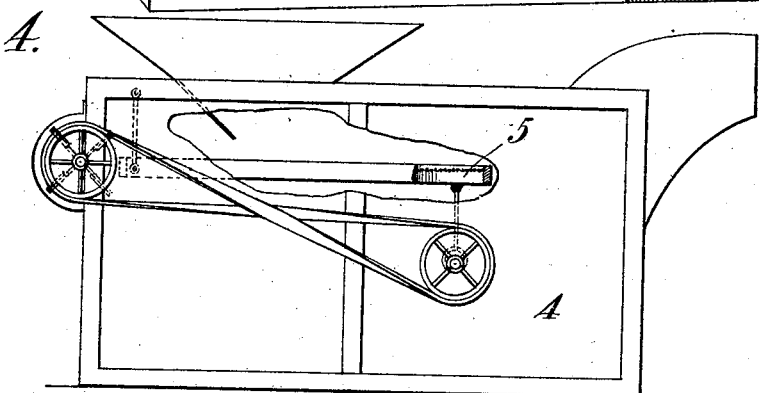

In said drawings:—Figure 1 is a detail view of a receptacle used for carrying out the first step of the process; Fig. 2 is a detail view of a screen which is used in connection with the process; Fig. 3 is a similar view of another receptacle which may be employed; and Fig. 4 is a view of a fanning mill in which the final separation is adapted to take place.

In carrying out the process constituting the present invention, the mixture of clover, buck horn and plantain seed is placed within the receptacle 1 and water is mixed therewith in the proportion of about fifteen gallons of water to one or two pecks of seed. The mixture is then thoroughly stirred with a paddle or other device, and a large portion of the buck horn seed, owing to the fact that it is lighter than the other seed, will rise to the surface of the water and can be removed by pouring off the water. This operation should be repeated several times and will result in the removal of most of the buck horn seed contained in the mixture. The remainder of the mixture is then poured on to the screen 2 where it will drain, and after it has been left thereon for about ten minutes the mixture is placed in the box 3. The moistening of the buck horn and plantain seeds causes a gummy substance to exude therefrom, while the clover seeds become of an oily nature. These results are taken advantage of by placing within the box 3 a quantity of dry sawdust about equal to or a little greater than the quantity of clover seed within the mixture. This mixture of seed and dry sawdust is then thoroughly stirred, and, as a result, the gummy buck horn and plantain seeds will adhere to the sawdust whereas the oily clover seeds will remain free therefrom and from the plantain seed.

The fanning mill 4 may be of any desired construction provided it has a screen 5 which will barely allow the clover seed to pass through it. The mixture within the box 3 is placed upon the screen in the fanning mill and as the plantain and buck horn seeds remain affixed to the sawdust it is obvious that they will not be passed through the screen 5. The clover seed, however, will pass through the screen, and, therefore, said seed will be thoroughly separated from the sawdust and buck horn and plantain seeds which will remain within the mixture. The dry sawdust upon being added to the mixture serves to absorb the moisture from the seeds and to thoroughly dry them so that the separation of the clover seed can be readily effected within the fanning mill. Moreover, the air blast within the mill will, of course, blow the fine dust from the screen so that nothing but clover seed will remain to pass through the screen within the mill.

By carrying out the process herein described the seed does not become bleached or swollen and the separation of the clover seed from the objectionable seed is very effective and can be readily carried out. It will be seen that the apparatus employed is very simple and any person can conveniently carry on the separation without going to any considerable expense for apparatus.

Having thus described my invention, what I claim is:—

The herein described method of separating clover seeds from buckhorn and plantain seeds which consists in placing the mixed seeds in a body of water to cause oily and gummy exudations from the buckhorn and plantain seeds respectively, removing the floating buckhorn seeds from the surface of the water, draining the remaining mixture, subsequently thoroughly mixing the same with a relatively large proportion of sawdust and screening the so prepared mixture to separate the clover seeds.

In testimony that I claim the foregoing as my own, I have hereto affixed my signature in the presence of two witnesses.

JOSEPH P. BURGESS.

Witnesses:
HEZEKIAH LUCKETT,
ERON B. STOTSENBURG.